H. A. KING.
ROTARY ENGINE.
APPLICATION FILED JUNE 19, 1909.

1,010,378.

Patented Nov. 28, 1911.

H. A. KING.
ROTARY ENGINE.
APPLICATION FILED JUNE 19, 1909.

1,010,378.

Patented Nov. 28, 1911.
7 SHEETS—SHEET 3.

Witnesses
G. F. Tobow.
Francis G. Boswell

Inventor
Homer Arthur King.

By D. Swift & Co.
Attorneys

UNITED STATES PATENT OFFICE.

HOMER ARTHUR KING, OF COLTON, CALIFORNIA.

ROTARY ENGINE.

1,010,378. Specification of Letters Patent. Patented Nov. 28, 1911.

Application filed June 19, 1909. Serial No. 503,248.

*To all whom it may concern:*

Be it known that I, HOMER ARTHUR KING, a citizen of the United States, residing at Colton, in the county of San Bernardino and State of California, have invented a new and useful Rotary Engine, of which the following is a specification.

This invention is classified in the art of engines, especially of the rotary type, in which steam may be used.

This invention particularly pertains to a type of engine, more especially adapted for various purposes, in which power is particularly needed. For instance, the engine may be used in a practical manner, and in an effective way upon automobiles and the like; or the same may be used for running various types of machinery. Further the engine may be so arranged as to be applied upon aeroplanes, or other similar vehicles.

When the engine is utilized upon sea-going vessels, the same is constructed in such wise as to propel one or more propellers in opposite directions, thus producing considerable power, by turning the propellers in opposite directions against opposing currents.

In the drawings, Fig. 2 is a cross sectional view on line 2—2 of Fig. 1, showing the rotary head and the pistons rotating in one direction.

Relative to the several views of the drawings, 1 represents a solid shaft having a shouldered portion 2, and showing the same telescopically received, for a portion of its length, by the sleeve or hollow shaft 3.

Figure 4:
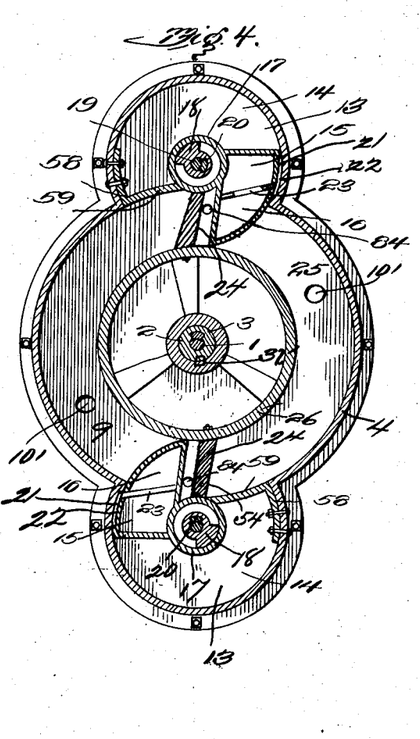
Fig. 4 is a cross sectional view upon line 5—5 of Fig. 1, showing the abutments in the act of being lifted from the path of the traveling pistons.
Figure 5:
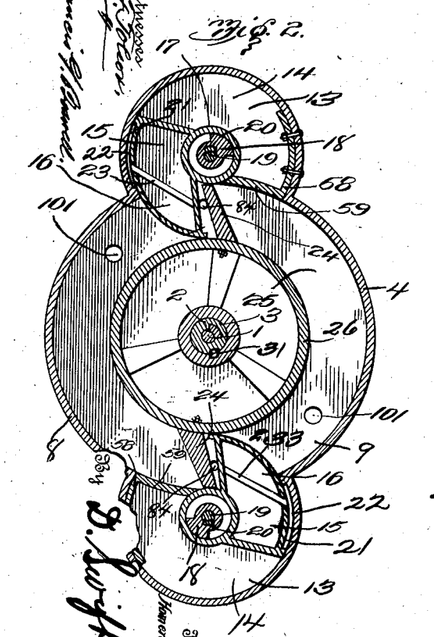
Fig. 5 is a cross sectional view upon line 6—6 of Fig. 1, showing the means or a regulator, whereby the intake of steam is regulated.
Figures 5, 6, 7, 8:
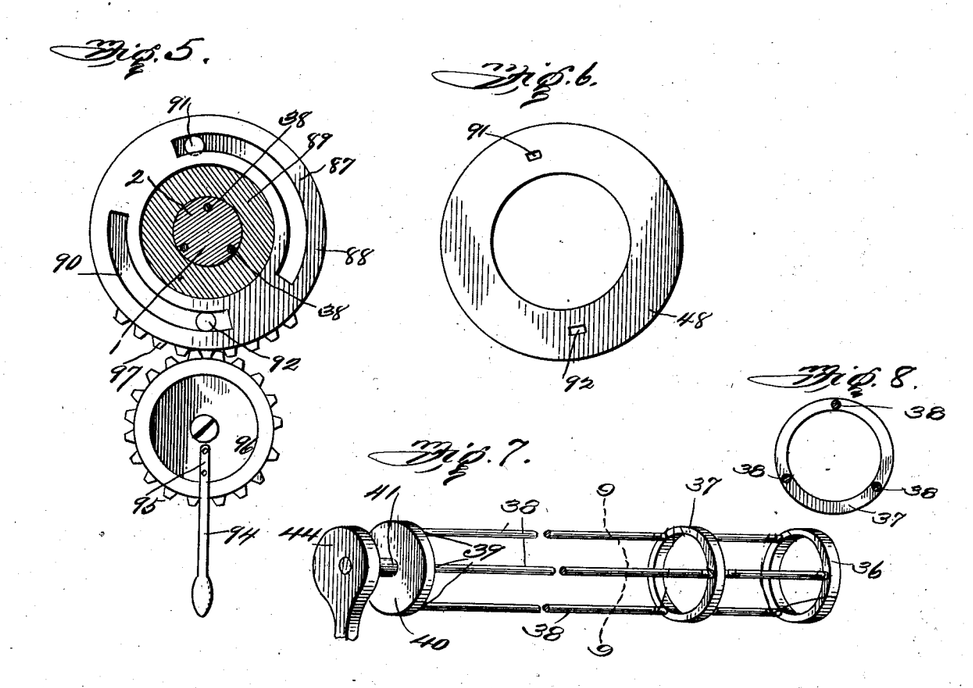
Fig. 6 is a sectional detail view of one of the revolving valves which coöperate with the regulators.
Fig. 7 is a detail perspective view of a portion of the solid part of the main shaft of the engine, and the band wheel or pulley, disclosing the novel means for shifting the band wheel.
Fig. 8 is a sectional view on line 9—9 of Fig. 7.
Figure 9:
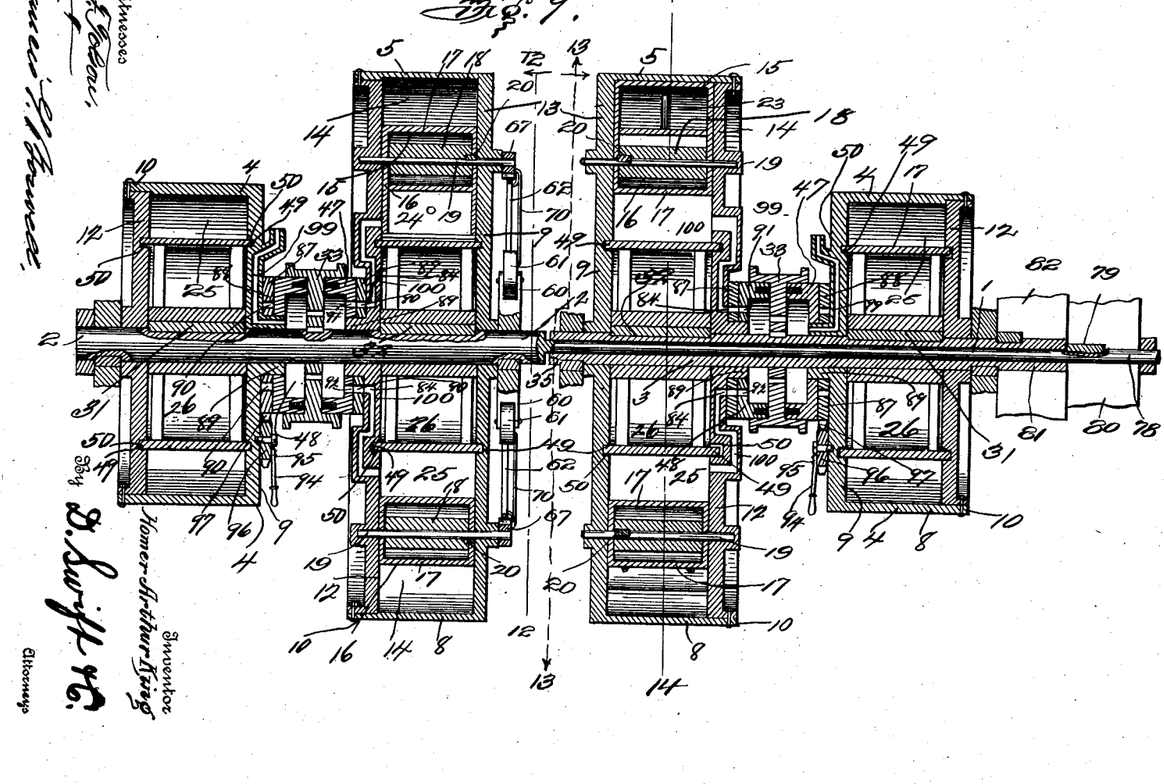
Fig. 9 is a fragmentary longitudinal sectional view through a modified form of engine.

4 and 5 denote casings of the engines. These casings are composed of the annular walls 8 (which are integral with the disk portions 9 of the casings), while the peripheral portions 10 (which are provided with flanges 11) are bolted to annular plates 12. These parts 9, 8 and 12 are provided with extensions 13, which go to produce casings or inclosures 14, in which the oscillating abutments 15 are pivotally mounted. These oscillating abutments consist of segmental shaped casings 16 having hub portion 17 (which are provided with radially extending end enlargements 18) which are mounted upon the shafts 19, and keyed to rotate therewith, as shown at 20. These abutments upon their partial circular portions are provided with recessed portions 21, which, with the wall of the casings 14, form chambers 22. These chambers are provided for the purpose of receiving a certain amount of steam, in order to cushion the abutments when lowering to the positions shown in Figs. 2 and 4. Extending across the casings 16 are pipes or tubes 23, which communicate with the chambers through which the steam may extend.

The solid and hollow shafts have rotatable therewith revolving or rotating piston-carrying heads 26, with which the pistons 24 are rotatable. It will be noted that this portion of the shaft 1 is solid through the entirety of the casing 4. These piston-carrying heads are keyed to the sleeve or tubular shaft and the solid shaft, as shown at 31 and 32.

Figure 1:
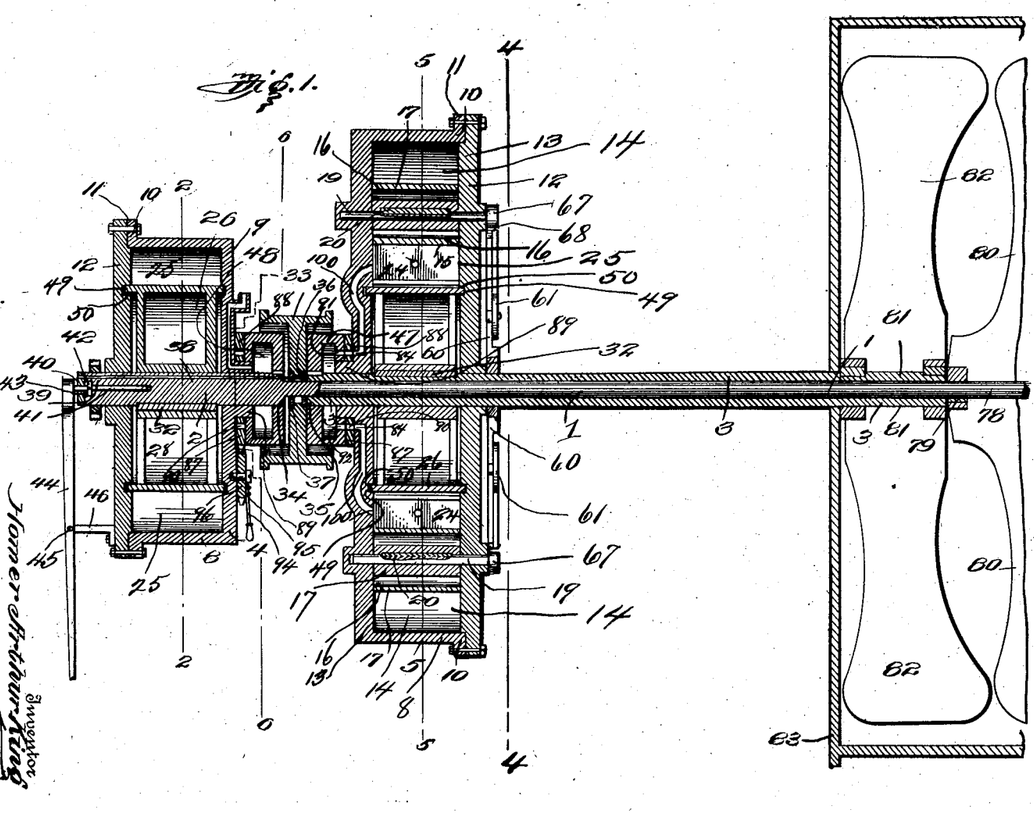
Figure 1 is a longitudinal sectional view through the engine, showing the features of the invention.

Loosely journaled upon the restricted portion of the solid shaft is what may be termed a band wheel or pulley 33, and between the shouldered portion 34 of the solid shaft and one of the extremities 35 of the sleeve or tubular portion of the shaft. Also journaled upon the solid restricted portion of the solid shaft, and located upon each side of the band wheel, are collars 36 and 37, through which and the band wheel, a plurality of rods 38 extend and also are secured thereto. These rods 38 penetrate the enlarged portion of the solid shaft, as seen clearly in Fig. 1. These rods have their ends or extremities 39 secured to a collar 40, which is disposed adjacent the extremity of the solid portion of the shaft. Loosely penetrating the enlarged portion of the solid shaft is a pin 41, on which is secured a collar 42. This collar 42 is seated within a recess 43 of the enlarged portion of the solid shaft, and adjacent the face of the collar 42, which engages the extremity of the enlarged portion of the solid shaft. The purpose of locating the collar 42 in this manner is to allow the same to engage the collar 40 (through which the pin 41 extends) so that as the lever 44 (which is fulcrumed at 45 to a stud 46) is oscillated, the collar 40 will be drawn in the direction of the lever 44, thus shifting the band wheel or pulley 33 from contact with the valve 47, in contact with the valve 48, in order to reverse the apparatus (not shown) which may be belted to the band wheel.

The apparatus, which may be belted to the band wheel may be of any desired character. For instance, the propeller shaft of an aeroplane may be belted to the band wheel, or any form of machinery may also be belted to the band wheel. The object of providing this band wheel is to permit that which is belted to it to be reversed.

The piston-carrying heads of the various engine cylinders are provided with annular flanges upon each side, designated by the characters 49, which are received within the annular recesses or grooves 50 of the casings of the engines, in order to obviate the use of packing. The pistons 24 are disposed tangentially with regard to the outer circumferences of the heads.

The inclosures 14 have bolted upon their interiors angular plates 58, the portions 59 of which are slightly curved on the arc of a circle, using the center of the shaft of the engine as a center. These curved portions 59 contact with the hub portions 17 of the abutments, in order to prevent the steam from entering the spaces upon the other sides of the said portions 59. These portions 59 are further designed for the purpose of completing the annular chamber 25.

Figure 3:
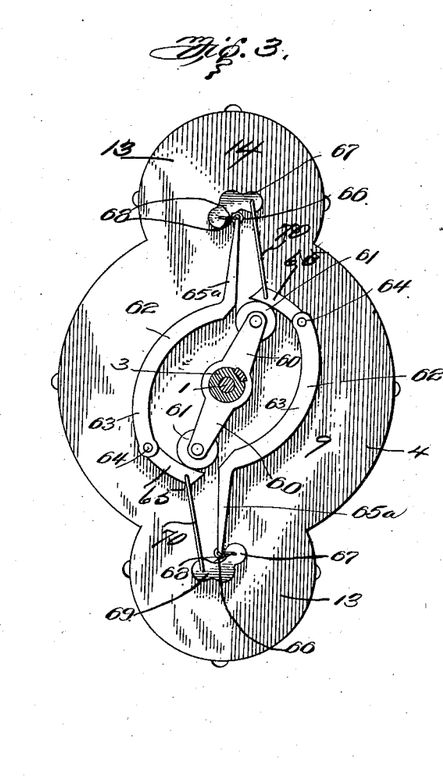
Fig. 3 is a sectional view on line 4—4 of Fig. 1, showing the mechanism for operating the oscillating abutments.
Figure 10:
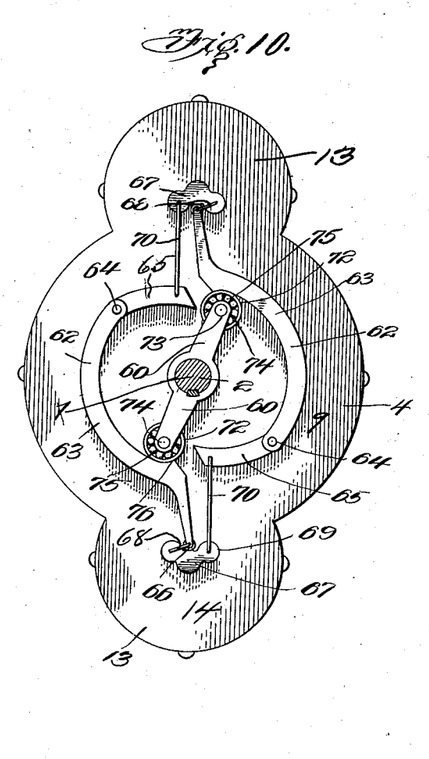
Fig. 10 is a sectional view on line 12—12 of Fig. 11, showing the member for operating the oscillating levers (which lift the abutments), said member being provided with ball bearing anti-frictional members.
Figure 11:
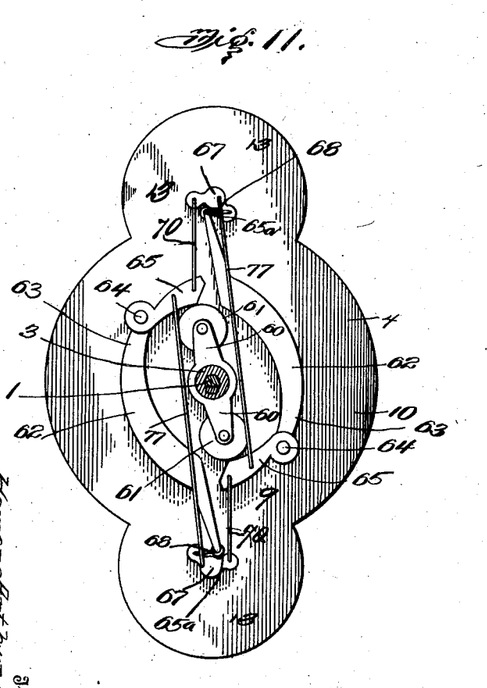
Fig. 11 is a sectional view on line 13—13 of Fig. 10, showing the oscillating levers and the members exteriorly mounted adjacent the engine's casing and carried by and movable with the abutments, connected by connecting rods, so that the levers and the members movable with the abutments may operate in unison.
Figure 12:
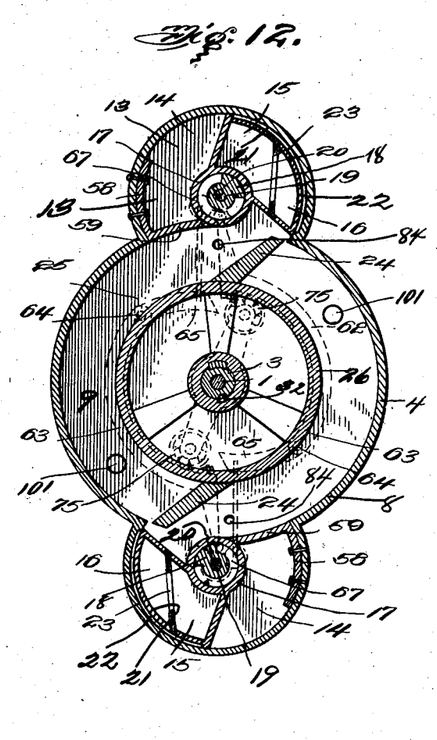
Fig. 12 is a sectional view upon line 14—14 of Fig. 11, showing the abutments completely lifted from the path of the pistons, and disclosing the form of mechanism for operating the oscillating levers, shown in Fig. 13 in dotted lines.
Figures 13, 14:
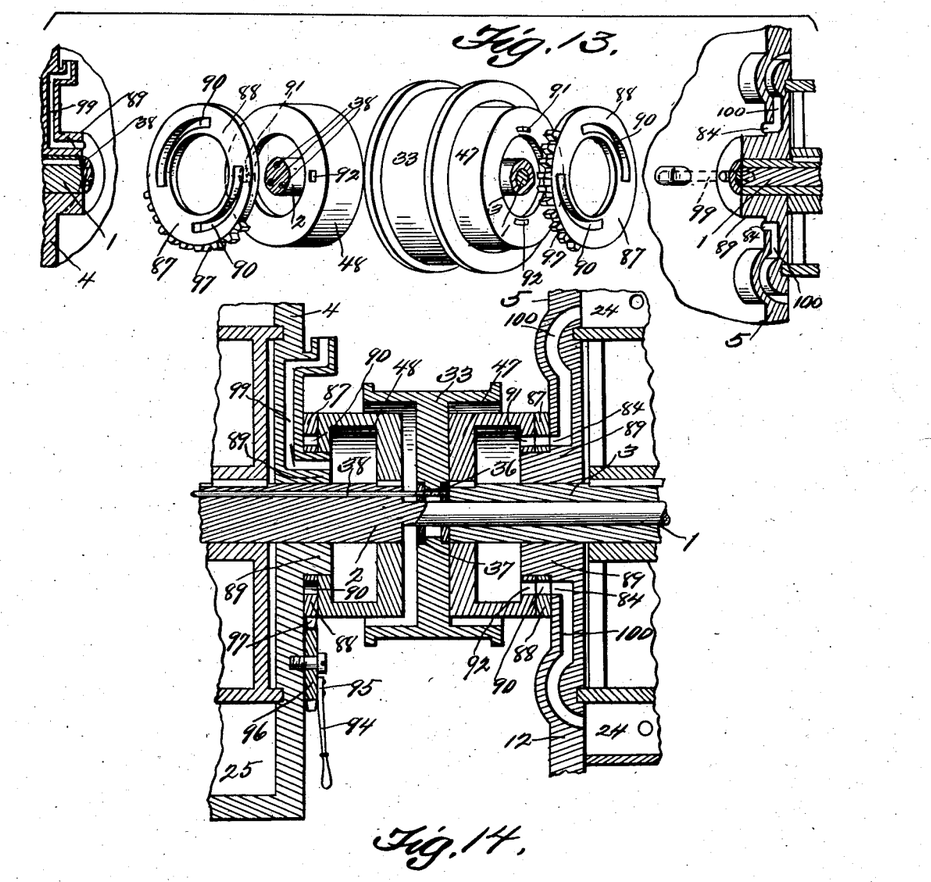
Fig. 13 is a view of portions of the casings of the engines, showing the band wheel, the valves which coöperate with the band wheel and the regulators which coöperate with the valves in perspective as dis-assembled, and showing the relative positions of said parts when they are about to be assembled.
Fig. 14 is an enlarged sectional view, disclosing the various parts shown in Fig. 13, assembled.

In Figs. 1, 3, 10, 11, 12 and 13, the solid shaft and the tubular shaft, which telescopically receives a portion of the solid shaft, are provided with revolving head members 60, which, as shown in Figs. 3 and 12, are provided at each end with anti-frictional members 61. The purpose of these anti-frictional members is to contact with the segmental or curved portions 62 of the levers or arms 63 (which are pivotally mounted at 64). Also mounted upon pivots 64 are short curved arms or members 65, with which the anti-frictional rollers or members 61 also engage. One of the arms or levers 63 of each of the engine cylinders is provided with an extension 65$^a$. These extensions 65$^a$ at their extremities are provided with anti-frictional members 66, which engage the cams 67. These cams 67 are mounted upon and rotate with the ends of the shafts of the abutments (which ends of said shafts extend through one side of the casings of the engines). The extremities of the extensions 65$^a$ are connected with one of the ends of the cams 67 by links 68, in order to prevent displacement of the said arms or levers 62 with regard to the cams. The ends 69 of the cams have link connections 70 with the ends of the arms 65, as shown clearly in Figs. 3, 11 and 12. As the solid shaft and the tubular shaft rotate, the revolving head members 60 also rotate, and, in so doing, the anti-frictional members 61 engage the arms or levers 62 and the arms 65, in order to oscillate them, and thus through the link connections 70 and the extensions 65$^a$, and their frictional members 66, the cams 67 are oscillated, in a direction suitable to lift the abutments from the path of the traveling pistons.

In Fig. 11 a modification of the anti-frictional member 61 is shown. In the modification of these anti-frictional members, the solid anti-frictional members, such as 61, as shown in Figs. 3 and 12, are dispensed with, and in lieu thereof, annular bands 72 are afforded, between which and the hubs 73, which may be integral with or separate from the stub axles 74, ball bearings 75 are arranged. The annular bands 72 and the hubs 73 are provided with annular raceways 76, in which the ball bearings may move. In Fig. 12, however, the arms 65 are provided with rod connections 77 with the cams 67, in order to insure the oscillations of the abutments. In Fig. 12, the operations of the arms or levers 62 and the arms 65 are similar to those shown in Figs. 3 and 11.

The extremity 78 of the restricted portion of the solid shaft has keyed thereto, as shown at 79, a propeller 80, while the extremity 81 of the tubular shaft is provided with another propeller 82, which is keyed to rotate therewith. It will be noted that these propellers are designed to operate in opposite directions, in order to afford great power, by rotating the propellers against opposing currents of air or water. These propellers rotate within a casing 83, in the present application, it being understood, however, that the propellers and the engines may be applied to sea-going vessels or similar crafts in any conventional manner, suitable to the requirement.

The engine receives steam through the ports or intakes 84, by way of the valves 47 and 48 between the traveling pistons and abutments. When the steam is admitted, the pistons 24 are rotated within the chambers 25, and as they travel within the chambers, the piston-carrying heads are rotated at the same time. Just so soon as the steam is admitted, the valves of the pistons yield, and from the result of the direct admission of steam, the back pressure upon the abutments is relieved by the resiliency of the valves, and also by the provision of the chambers 22. The pistons are forced through the chambers 25, by the admission and expansion of the steam. When the pistons are approaching the abutments, the abutments are raised through the action of the revolving head members (which are revolved or rotated by the solid or tubular shafts), the arms or levers 62 and 65, the rods 77, the links or rods 70, the links 68 and the cams 67. The intakes or ports 84 of the engine are located at right angles to one another, as shown in the drawings. In Fig. 10, the shifting mechanism for the band wheel is dispensed with. However, if the load upon the engine is light, the intake of steam may be decreased by means of the regulators 87, so that the pistons may only be started in their movements through the chambers 25, after which the pistons may complete their strokes, by virtue of the expansion of the steam. The regulators consist of the annular rings 88, and are located between one of the valves and the casings of the engines, so as to surround the hub portions 89 of the casings. These annular rings are provided with segmental slots 90 which are adapted to register with openings 91 and 92 of the valves and said intakes or ports 84. By adjusting these rings annularly, the segmental slots may be so arranged with regard to the openings 91 and 92 and the intakes or ports 84 so that the intake of steam may be increased or decreased. To adjust these annular rings, the casings of the engines have fulcrumed thereto levers 94, to the ends 95 of which pinions or gears 96 are carried. These gears or pinions engage gear teeth 97 of the said annular rings. These gear teeth 97 only extend part way about the said annular rings, or sufficiently to correspond to the length of the segmental slots, and as the levers 94 are oscillated, the annular rings are adjusted to the desired positions. The intake of steam travels through the ducts 99, until it reaches the valves 47 and 48, after which it passes through the slots of the annular regulator rings into the ducts 100, in order to emerge into the steam chamber in the rear of the pistons 24 and in front of the abutments, thus forcing the pistons through the annular chambers 25. As the pistons are about to approach the abutments, the utilized steam is exhausted through the exhaust ports 101, which are located in the vicinity of the abutments, and communicate between the chambers 25 and the atmosphere.

The invention having been set forth, what is claimed as new and useful is:—

1. In a rotary engine, a plurality of casings having a solid shaft and a hollow shaft extending therethrough, said solid shaft having a portion of its length received by the hollow shaft, a band wheel positioned between the hollow shaft and a shouldered portion of the solid shaft, means for shifting the band wheel, said solid shaft having an enlargement at one end, and valve members carried by the enlargement at one end of the hollow shaft to be contacted with by the band wheel.

2. In a rotary engine, a solid shaft having an enlargement thereon, a hollow shaft receiving a portion of the length of the solid shaft, a band wheel or pulley located between the hollow shaft and the enlargement, means for shifting the band wheel, and valve members carried by the enlargement and the hollow shaft to be contacted with by the band wheel.

3. In a rotary engine, an operating shaft having valve members, a band wheel located between the members, and means to shift the band wheel to contact with either of the members.

4. In a rotary engine, a shaft having valve members, a band wheel located between the members, rods connected to the band wheel, a collar secured to the ends of the rods, a lever fulcrumed to the end of the engine having means coöperating with the collar carried by the rods to shift the band wheel.

5. In a rotary engine, a shaft having valve members, a band wheel located between the members, rods connected to the band wheel, a collar secured to the ends of the rods, a lever fulcrumed to the end of the engine having means pivoted to the end loosely received within the end of the shaft, and designed to coöperate with the collar carried by the rods to shift the band wheel.

6. In combination, two rotary engines having annular chambers and provided with rotors having pistons, rotatable within the annular chambers, shafts for the rotors, valve members mounted upon each of the shafts, inlets for the steam and adapted to be controlled by the valve members, mutilated gears mounted between the valve members and the casings, pinions to mesh with the teeth of the mutilated gears, and means for partially rotating the pinions, whereby the mutilated gears may be adjusted annularly, said mutilated gears having segmental slots designed to coöperate with the steam inlets whereby the steam may be regulated.

7. The combination of two engines having duplicate oppositely revoluble valve members and provided with intake ports controllable by the members, a revoluble member between the valve members to be reversed in movement by one or the other of the valve members, annularly adjustable mutilated gears having slots located between the valve members and the engines, pinions to mesh with the teeth of the mutilated gears, and means for partially rotating the pinions, whereby the mutilated gears may be adjusted, so that the slots therein may coöperate with the intake ports to regulate the inlet of steam.

8. The combination of two engines having valve members between the engines, provided with intake ports, a band wheel located between the valve members, and spaced apart therefrom, manually operated means to coöperate with said intake ports, whereby the steam may be regulated, rods connected to the band wheel, a collar secured to the ends of the rods, a lever fulcrumed to the engine having means coöperating with the collar to shift the band wheel in contact with one or the other of the valve members.

9. In a multiple cylinder engine, steam inlets, a pair of duplicate revoluble members, each constituting a clutch to reverse the transmission of power, and acting as a valve for controlling the inlets.

10. In a multiple cylinder engine, steam inlets, a pair of duplicate revoluble members, each constituting a clutch to reverse the transmission of power, and acting as a valve for controlling the inlets, and means between the members and the inlets for regulating the intake of steam.

11. In a multiple cylinder engine, steam inlets, duplicate revoluble members, each acting as a clutch to reverse the transmission of power, and as a valve for controlling the inlets, and a member between the first members adapted to be shifted in contact frictionally with one or the other of the first members, whereby its movement may be reversed.

12. In a multiple cylinder engine, steam inlets, duplicate revoluble members, each acting as a clutch to reverse the transmission of power, and as a valve for controlling the inlets, a member between the first members adapted to be shifted in contact frictionally with one or the other of the first members, whereby its movement may be reversed, and means between the first members and the inlets for regulating the intake of steam.

13. In a multiple cylinder engine, a plurality of steam inlets, a pair of duplicate oppositely revolving valve members for controlling the inlets, a member revolubly mounted between the valve members adapted to be reversed by the valve members, and means for shifting the member in contact with one or the other of the valve members.

14. In a multiple cylinder engine, a plurality of steam inlets, a pair of duplicate oppositely revolving valve members for controlling the inlets, a member revolubly mounted between the valve members adapted to be reversed by either of the valve members, means for shifting the member between the valve members, and means between the inlets and the valve members for regulating the intake of steam.

15. In a multiple cylinder rotary engine, oppositely arranged engine casings having steam chambers, oppositely revolving rotors movable in the chambers and provided with pistons, shafts on which the rotors are mounted, said casings having steam inlets and exhaust ports, oppositely revolving valve members carried by the shafts for controlling the steam inlets, said valve members constituting clutch members for reversing a revoluble member between them in motion.

16. In a multiple cylinder rotary engine, oppositely arranged engine casings having steam chambers, oppositely revolving rotors movable in the chambers and provided with pistons, shafts on which the rotors are mounted, said casings having steam inlets and exhaust ports, oppositely revolving combined clutch and valve members carried by the shafts for controlling the steam inlets, a member loosely revolving on one of the shafts between the valve members adapted to be reversed in motion thereby, and means between the inlets and the valve members for regulating the intake of steam.

17. In a multiple cylinder rotary engine, oppositely arranged engine casings having steam chambers, oppositely revolving rotors movable in the chambers and provided with pistons, shafts on which the rotors are mounted, said casings having steam inlets and exhaust ports, oppositely revolving combined clutch and valve members carried by the shafts for controlling the steam inlets, a member loosely revolving on one of the shafts between the valve members adapted to be reversed in motion thereby, means between the inlets and the valve members for regulating the intake of steam, and means swiveled to one of the shafts and provided with connections, which penetrates the shaft, with the loosely revolving member for shifting the revolving member, so that it may be reversed.

18. In a rotary engine, a casing, a shaft therein, provided with a rotor having a piston, a steam chamber in which the piston travels, oppositely arranged raisable abutments having shafts, cams rockable with the ends of the shafts of the abutments, pivoted lever arms having link connections with the cams, two of the lever arms having at one of their ends frictional members to engage the cams, means carried by the engine shaft for spreading the lever arms whereby the cams are actuated so as to raise the abutments from the path of the traveling pistons.

19. In a rotary engine, a casing a shaft therein, provided with a rotor having a piston, a steam chamber in which the piston travels, oppositely arranged raisable abutments having shafts, cams rockable with the ends of the shafts of the abutments, pivoted lever arms having link connections with the cams, two of the lever arms having at one of their ends frictional members to engage the cams, a crosshead carried by the engine shaft, for spreading the lever arm so as to actuate the cams, whereby the abutments may be raised from the path of the traveling pistons, and steam inlet and exhaust ports.

20. In a rotary engine, a casing, a shaft therein, having a rotor provided with pistons, said casings having steam chambers in which the pistons travel, said casings having offset casings, abutments raisable within the offset casings and from the path of the traveling pistons, means for raising and lowering the abutments, the offset casings and the abutments at one of their ends having oppositely arranged extensions, thus providing spaces between the abutments and the offset casings to receive a minimum supply of steam to cushion the abutments when lowered by said means, tubes extending angularly across the abutments and arranged communicatively between said spaces and the front of the abutments, to admit of the minimum supply of steam, as the abutments are raised, steam inlet and exhaust ports for the engine.

21. In a rotary engine, a casing, a shaft therein, provided with a rotor having a piston, a steam chamber in which the piston travels, steam inlet and exhaust ports, a combined clutch and valve member for controlling the inlets adapted for transmitting motion to a member loosely journaled on the engine shaft, said combined valve and clutch member being carried by the engine shaft, oppositely arranged raisable abutments having shafts, cams rockable with the ends of the shafts of the abutments, pivoted lever arms having link connections with the cams, two of the lever arms having at one of their ends frictional members to engage the cams, means carried by the engine shaft for spreading the lever arms whereby the cams are actuated so as to raise the abutments from the path of the traveling pistons.

22. In a multiple cylinder engine, inlets, a pair of oppositely revoluble shafts valve members rotatable with the shafts to control the inlets, a device adapted to be shifted in contact with one or the other of the valve members, and means carried by one of the shafts for shifting the device.

In testimony whereof I have signed my name to this specification in the presence of two subscribing witnesses.

HOMER ARTHUR KING.

Witnesses:
M. A. BAGLEY,
R. J. BITTIEK.

Copies of this patent may be obtained for five cents each, by addressing the "Commissioner of Patents, Washington, D. C."